Figure 1:
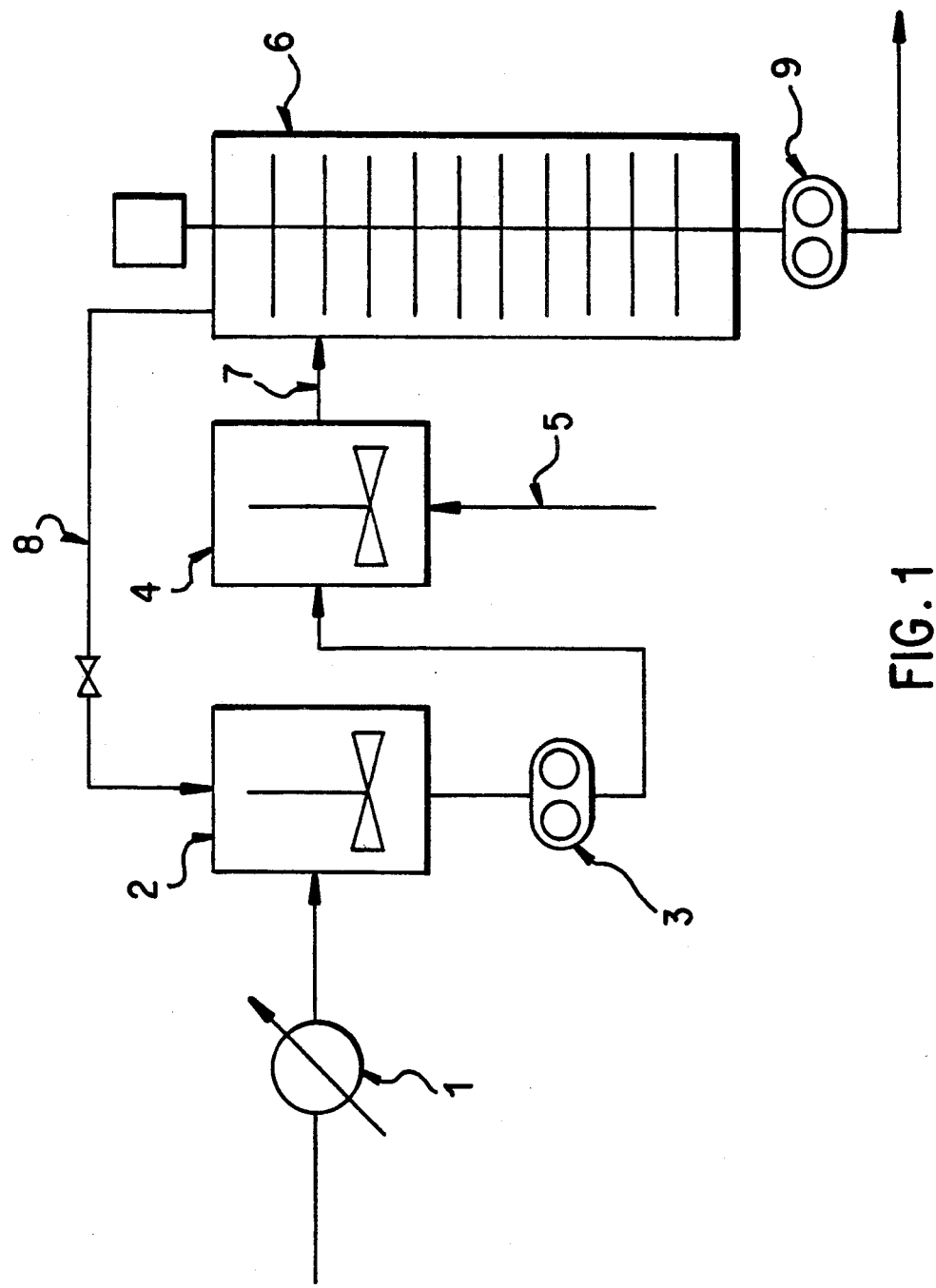

United States Patent
Buonerba et al.

Patent Number: 5,166,260
Date of Patent: Nov. 24, 1992

[54] PROCESS FOR THE CONTINUOUS BULK PRODUCTION OF HIGH IMPACT VINYLAROMATIC (CO)POLYMERS

[75] Inventors: Claudio Buonerba, Mantova; Savino Matarrese, Verona; Franco Balestri, Mantova; Italo Borghi, Ferrara, all of Italy

[73] Assignee: Montedipe S.r.l., Milan, Italy

[21] Appl. No.: 486,241

[22] Filed: Feb. 28, 1990

[30] Foreign Application Priority Data

May 24, 1989 [IT] Italy ............................ 20623 A/89

[51] Int. Cl.$^5$ .......................................... C08F 279/00
[52] U.S. Cl. ...................................... 525/52; 525/53; 525/54; 525/243; 525/261; 525/263; 525/301; 525/302; 525/316
[58] Field of Search ................ 524/534, 535; 525/52, 525/53, 54, 243, 261, 316, 263, 301, 302; 526/74

[56] References Cited

U.S. PATENT DOCUMENTS

| | | |
|---|---|---|
| 3,945,976 | 3/1976 | McCurdy et al. |
| 3,981,944 | 9/1976 | Okamoto et al. |
| 4,254,236 | 3/1981 | Burk ................................ 525/316 |
| 4,325,919 | 4/1982 | Sato et al. |
| 4,433,099 | 2/1984 | Küpper et al. ................. 525/316 |
| 4,451,612 | 5/1984 | Wang et al. .................... 525/316 |
| 4,594,391 | 6/1986 | Jones. |
| 4,640,959 | 2/1987 | Alle. |

FOREIGN PATENT DOCUMENTS

WO03538 5/1988 World Int. Prop. O.

OTHER PUBLICATIONS

*Chemical Engineers' Handbook*, Fourth Edition, 1964, pp. 24-25, John H. Perry, et al. Ed.

Primary Examiner—Joseph L. Schofer
Assistant Examiner—R. H. Delmendo
Attorney, Agent, or Firm—Morgan & Finnegan

[57] ABSTRACT

Process for the continuous bulk production of high impact vinylaromatic copolymers in which the vinylaromatic monomer, and if present, a comonomer selected from the group consisting of acrylonitrile, methacrylonitrile, acrylic acid, methacrylic acid and their alkyl- or cyclo-alkyl-esters containing from 1 to 8 carbon atoms in the alkyl group, the rubber, a part of the diluent solvent and the catalyst are premixed in a premixer at a temperature under 100° C. and fed to a plug-flow agitated tubular reactor, which is divided into several stages or zones. The excess mixture is recycled to the premixer and the remaining part of the diluent solvent is injected into the top of the reactor to prevent the formation of incrustations. In the first zone of the reactor, the temperature and the residence time of the mixture are regulated so to have the halving the catalyst life.

The polymerization is carried on in the following zones of the reactor until at least the 40% by weight of solids and it is eventually brought to conclusion in one or more consecutive tubular reactors like the first one. The reactors are set in series.

23 Claims, 3 Drawing Sheets

PROCESS FOR THE CONTINUOUS BULK PRODUCTION OF HIGH IMPACT VINYLAROMATIC (CO)POLYMERS

BACKGROUND OF THE INVENTION

1. Field of the Invention

The present invention relates to a process for the continuous mass production of high impact vinylaromatic copolymers.

In more detail, this invention relates to a process for the continuous bulk production of high impact copolymers based on vinylaromatic and monomers.

2. Discussion of the Prior Art

It is well known that the impact resistance properties of polystyrene can be improved by mixing therewith a rubbery material. To obtain this the two components can be mechanically mixed or, in a more favourable way, the styrene polymerization is carried out in the presence of the rubbery material.

In this last case the procedure is generally to dissolve the rubbery material in the monomer styrene and then to polymerize this solution in continuous or discontinuous, in bulk, in solution or in a combined bulk/suspension polymerization process.

Immediately after the beginning of the polymerization reaction the solution of the rubbery material in monomer styrene separates into two phases; one of them, that is a solution of the rubber in monomer styrene, initially forms the continuous phase; while the other, that is a solution of polystyrene resulting in its own monomer, remains dispersed in this phase in drops form. By the increasing of the conversion the quantity of the second phase increases at the expense of the first one; as soon as the quantity of formed polystyrene exceeds the quantity of employed rubber, an exchange takes place in the phase, that is generally called phase inversion.

When this inversion takes place, drops of rubbery material solution are forming in the polystyrene solution; but these drops of rubbery material solution incorporate, on their turn, little drops of what has now become the continuous polystyrenic phase. At the same time, a grafting of the rubber by the polystyrene chains takes place during this polymerization.

Usually the polymerization is carried out in several stages. In the first polymerization stage, that is called prepolymerization, the rubber solution in styrene is polymerized until a conversion is reached that is superior to the phase inversion; afterwards the polymerization is carried on until the desired styrene conversion.

The continuous bulk polymerization is described, for example, in the U.S. Pat. No. 2,694,692, 3,243,481 and 3,658,946. The combined bulk/suspension discontinuous polymerization is described, for example, in the U.S. Pat. No. 3,428,712.

It is well known that the properties of the styrenic polymers, and in particular their stress crack resistance, especially when they come in contact with fatty substances, can be improved by introducing little quantities of a vinylcyanide in the polymer.

It is also known that the improved impact resistance properties of the styrenic polymers can be influenced and varied during the polymerization by varying the grafting degree of the polystyrene chains on the rubber.

Several attempts have been made to this purpose, but none of them has allowed to realize the grafting at the desired degree, in conditions acceptable from an industrial point of view. An attempt to increase the grafting degree of the rubber lies in using block-rubbers of the A-B, A-B-A, or B-A-B type (in which A is a styrene block and B a butadiene block) or in using star-shaped block copolymers. This attempt is described in the patents DE-A-2,646,508, DE-A-2,646,509 DE-A-2,717,777 and DE-A-2,504,118.

However, this attempt is scarcely attractive from an industrial point of view because of the particular operative conditions to be used with those types of rubbers.

It is possible to realize in situ the bond between the rubber and the thermoplastic component, by carrying out the polymerization in the presence of an initiator, usually a conventional peroxide; but in this case problems can be caused by the technical difficulties connected with the polymerization, such as an unsuitable removal of the heat or excessive viscosity of the solution or premature cross-linking of the rubber at high temperatures; only low concentrations can be used. As an alternative, if conventional concentrations of catalyst are employed, only low temperatures can be employed, with consequent low grafting degree and unsufficient mechanical properties.

The U.S. Pat. No. 4,282,334 suggests, in example 1, to increase the grafting degree by carrying out the polymerization, in the initial stage, under adiabatic conditions. Even if this method allows to reach a good grafting degree, the accomplishment of this process on industrial scale involves insuperable difficulties, because the reaction becomes uncontrollable.

The same U.S. patent suggests that a high degree of grafting can be obtained under isothermal conditions in a tubular reactor, in the presence of a catalyst at high temperature. However, tests carried out by the Applicant have demonstrated that also this process is not free from problems, because of the formation of cross-linked polymer, above all on the top of the reactor, so that the reactor is completely obstructed after 1-2 days. These problems are noticed particularly in the case of the copolymerization of styrene with vinyl-cyanide monomer.

DISCLOSURE OF THE INVENTION

The present invention overcomes all the problems connected with the bulk continuous polymerization of a vinylaromatic monomer carried out in a plug-flow agitated reactor, also in the case of its copolymerization with a vinyl-cyanide monomer.

The present invention provides a continuous, bulk or solution process to produce high impact styrene polymers or copolymers, this process is realizable and reproducible from an industrial point of view and it permits to produce a high grafting of the (co)polymer on the rubber.

The process of the present invention consists of:

a) mixing, in one or more heated mixers, at a temperature under 100° C., the vinylaromatic monomer, the rubber, the catalyst in a quantity not exceeding the 0.1% by weight in comparison with the monomers, the comonomer, if present, an inert solvent in a quantity not exceeding the 20% by weight in comparison with the mixture, and the (co)polymer formed by these monomers, in a quantity not exceeding the 10% by weight in comparison with the total mixture;

b) feeding the obtained solution a) in to the head of a plug-flow agitated vertical tubular reactor, which is divided into three consecutive zones, heated at different temperatures between 100° and 150° C., with a flow rate higher than the one of the mixture coming out of the reactor;

c) recycling the excess of feeding solution from the vertical reactor to the mixer, d) injecting the solvent, in a quantity not exceeding the 5% by weight, in comparison, with the solution, on the top of the vertical reactor;

e) keeping the obtained solution a) in the first zone of the vertical reactor for a time sufficient to halve the catalyst life, at the temperature of this first zone; and f) continuing the polymerization in the following zones of the vertical reactor until it is obtained a solid content of at least 40% by weight outcoming from the third zone of the reactor.

The polymerization can then be carried out in one or more consecutive, plug-flow agitated, tubular reactors until the yield of a solid content of at least 70% by weight, then the obtained polymerization mixture is submitted to devolatization.

The solution of the vinylaromatic monomer, the rubber, the catalyst, the comonomer is present, the inert solvent and the (co)polymer can be made in a single mixer or, better, in two separated mixers; in the first, kept at a temperature not exceeding 100° C., the vinylaromatic monomer the rubber and the inert solvent are mixed; in the second, that is not heated, the catalyst and the comonomer, if present, are added. The fundamental conditions in the preparation stage of the solution are the temperature that must not exceed 100° C. and the catalyst addition that is effected immediately before the feeding of the solution to the vertical reactor, in order to avoid a remarkable polymer formation.

In the mixer or in the first mixer, if two mixers are employed, little copolymer quantities are present, these quantities, however, do not exceed the 10% by weight in comparison with the fed solution.

The above mentioned polymerization conditions, in particular the time and the temperature at which the mixture is kept in the first zone of the reactor, are essential for the obtainment of a high gel content, given by the styrenic (co)polymer quantity grafted on the rubber.

The rubbers used in the process of the present invention are the natural or synthetic rubers usually employed for the production of styrenic high impact polymers. Suitable rubbers are the homopolymers or copolymers of conjugated dienes having from 4 to 6 carbon atoms such as polybutadiene, polyisoprene and the butadiene and isoprene copolymers between themselves and with styrene and/or with other comonomers; these copolymers have preferably a transition temperature of the second order (Tg) lower than −20° C. The rubbery copolymers of butadiene and/or isoprene can contain the "random" or block distributed monomers. Other rubbery components suitable to the process of the present invention for the production of high impact styrenic polymers are the rubbery copolymers ethylene-propylene and the tertpolymers ethylene-propylene-diene.

The preferred rubber is a homopolymer of a conjugated diene containing 4 or 6 carbon atoms, in particular polybutadiene having a fraction above 25% of cis configuration.

The elastomeric styrene-diene block copolymers or the styrene-diene grafted copolymers are equally suitable to the process of the present invention. The grafted copolymers contain side chains of polystyrene grafted on a polydiene, preferably polybutadiene, as substrate. In the block copolymers the passage between each single block can take place suddenly or gradually; in particular block copolymers having formula A-B or A-B-A can be employed, in which A is a polystyrene block homopolymer and B a block polymer of a conjugated diene having from 4 to 6 carbon atoms, in particular butadiene, and styrene with random monomers distribution. The rubbers can be employed one by one or mixed together. The employed rubbery component should contain maximum 55% by weight of styrene homopolymer segments in block shape.

According to the process of the present invention, the rubber is first dissolved in styrene monomer and then the mixture is submitted to polymerization. Generally the rubber component is employed in quantities between 1 and 20% by weight, preferably between 2 and 15% by weight, based on the initial solution being polymerized.

An inert solvent, that acts as a diluent, is added to the solution being polymerized in a quantity not exceeding the 20%, preferably between 5 and 10% by weight, in comparison with the solution being polymerized.

Suitable examples of diluent inert solvent are the aromatic hydrocarbons, that are liquid at the polymerization temperature. Toluene, ethylbenzene, xylenes or mixture of these compounds, in any ratio, are preferred. If required auxiliaries and additives, such as for example antioxidizer stabilizers, lubricants, releasing agents, etc. can be added to the solution being polymerized.

The catalysts employed in the process of the present invention are the conventional ones usually employed in the styrene polymerization.

Examples of radicalic initiators, such as, organic peroxides useful in this invention are:

dibenzoyl peroxide, tertbutyl peroctoate, tertbutyl perbenzoate, ditertbutyl peroxide, 1,1'-tertbutylperoxycyclohexane, 1,1'-di-tert butyl-peroxy-3,3,5 trimethyl cyclohexane etc.

These catalysts are added in quantities below 0.1% and in particular between 0.005 and 0.05% by weight in comparison with the monomers.

"Chain transfer" agents can be used.

Examples of suitable "chain transfers" are the mercaptans containing from 4 to 18 carbon atoms, such as for example n.butyl-mercaptan, n.octyl-mercaptan, t.dodecylmercaptan, n.dodecylmercaptan etc. The mercaptan quantity, when it is used, is usually between 0.01 and 0.3% by weight based on the vinylaromatic monomer.

The vinyl aromatic monomer employed in the process of the present invention includes first of all styrene, but also styrenic monomers can be employed having one or more hydrogens replaced by alkylic or arylic radicals a halogen or a nytro radical such as for example alpha-methyl-styrene; mono-, di-, tri-, tetra-, and pentachloro styrene and the corresponding alpha-methyl styrenes such as ortho- and paraethyl styrenes, ortho- and para-alpha-methyl-styrenes etc. both on their own and mixed together or/and with the styrene.

The comonomer, if present, can be acrylonitrile, methacrylonitrile, acrylic acid, methacrylic acid and their alkyl- or cycloalkyl esters containing from 1 to 8 carbon atoms in the alkyle group, such as butyl-acrylate, ethyl-hexyl-acrylate, cyclohexyl-acrylate, methylmetacrylate and butyl metacrylate. These comonomers can generally be employed in quantities between 0 and 50% by weight, preferably between 5 and 30%, in comparison with the mixture of the monomers being polymerized.

The polymerization is carried out in tubular vertical reactors whose length is a multiple of the diameter and in which the product is only mildly agitated. Generally the ratio length/diameter is above 2, preferably between 3 and 10.

An essential aspect of the process of the present invention is the way by which the process is carried out during the first phase, that is, during the prepolymerization effected in the first stage of the tubular reactor. To obtain products having a high gel content, such as, for example, when polybutadienic rubbers are used, a grafting ratio, given by the ratio: gel % fed rubber %, above 3, preferably between 3,2 and 4,2, it is necessary that the monomers residence time in the first stage be at least the same time necessary to obtain the halving of the catalyst life, at the polymerization temperature.

The grafted rubber content, for the purpose of the present invention, means the constituent that is insoluble in toluene at room temperature (about 25° C.).

The half-life times of the catalyst at the various temperatures are data which may be found in the literature.

Figure 3:
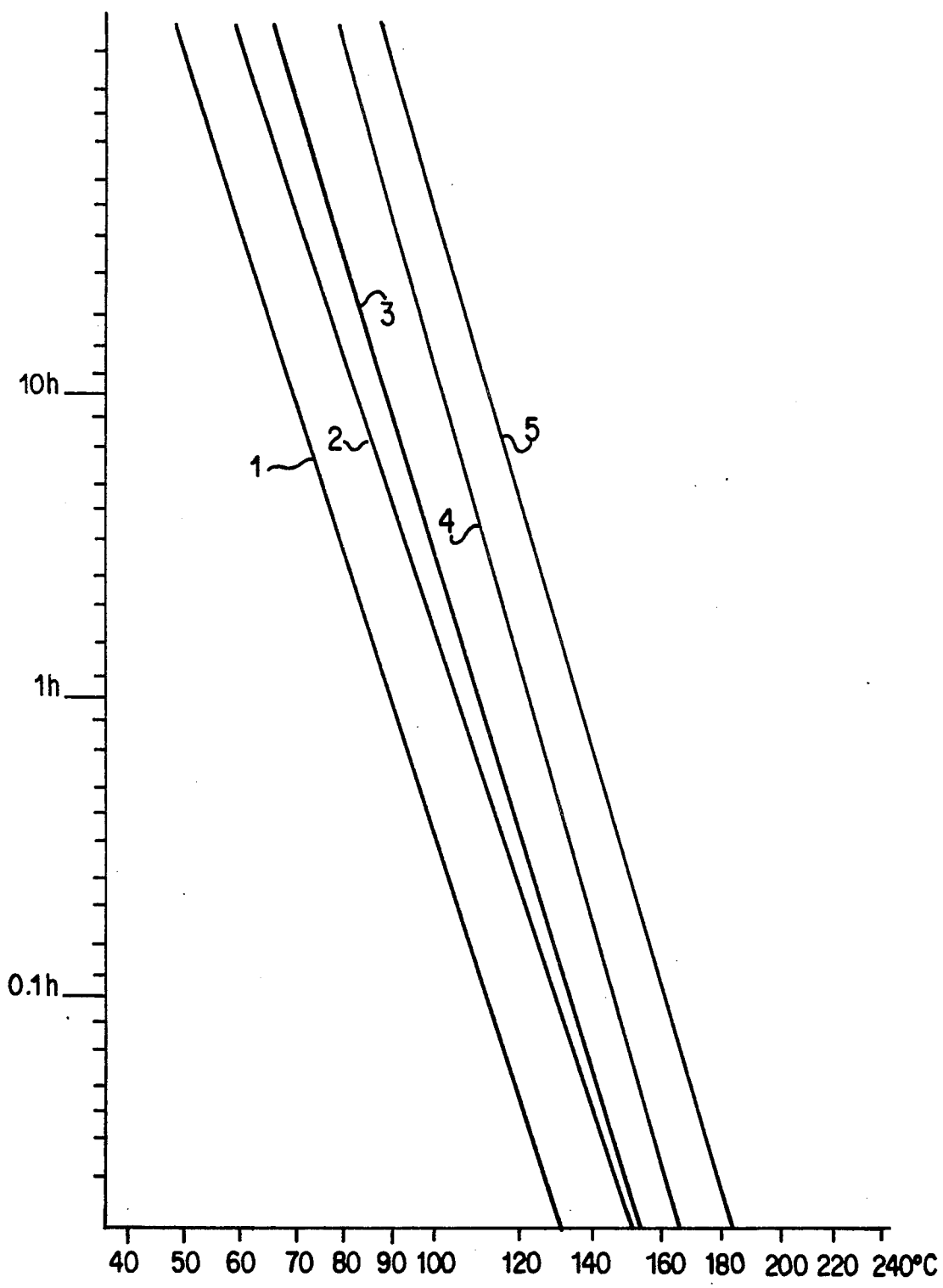

To give an example, the enclosed FIG. 3 reports the the graphics time/temperature of the following catalysts:
1. Tert.butyl peroxy-2-ethylhexanoate;
2. 1,1'-di-tert.butylperoxide-3,3,5-trimethylcyclohexane;
3. 1,1'-di-tert.butylperoxycyclohexane;
4. Tert.butyl-peroxybenzoate and
5. Di-tert-butylperoxide.

In this first zone the prepolymerization of the monomer(s)-rubber mixture takes place until the phase inversion is obtained. Afterwards the polymerization is continued in the following stages of the reactor until the yield of a solids content of at least the 40% by weight coming out of the third stage of the reactor.

In the tubular reactor, the temperature and the solids concentration rapidly increase from the income to the outlet point.

At the inlet point, the temperature and the solids content generally correspond to the values of the mixture fed from the mixer or the mixers, the temperature is of about 95° C. and the solids percentage is below 10% by weight and it corresponds to the (co)polymer content deriving from the recycle of the tubular reactor head. At the outlet point the temperature is generally of about 140°–150° C. and the solids content of at least the 40% of the solution.

A further essential characteristic of the process of the present invention is that a small portion of the inert solvent, employed as diluent of the monomeric solution, is sprinkled or injected, at room temperature onto the top of the vertical reactor in order to prevent the monomers polymerization in that zone. The quantity of injected solvent does not exceed the 5% by weight in comparison with the monomeric solution and it is preferred to inject it in coincidence with the rupture disk in the reactor. This continuous washing operation, besides decreasing the reagents and catalysts concentration on the reactor head, keeps the rupture disk chamber cold. The solvent flows in contact with the reactor walls and it is recycled to the mixer. The solvent employed can be the pure product or, preferably the one recovered by distillation from the polymerization bulk at the end of the process.

Moreover, to avoid the polymerization bulk climbing up to the rupture disk chamber, nitrogen or an other inert gas under pressure is blown into the zone, under the mentioned rupture disk at a the pressure usually above $0.1 \times 10^5$ and $1 \times 10^5$ Pascal.

The purpose of the injected nitrogen or inert gas is to create a gaseous film in contact with the head flange of the reactor, which enhances the effect of the washing condensate.

The continuous washing, with the inert solvent, combined with the presence of a gaseous film, eliminates all the problems connected with the dirtying of the top of the reactor and, in particular, of the rupture disk, even after several months of continuous working.

During the polymerization, particularly during the preparation of the rubber-vinylaromatic monomer mixture, conventional additives can be added, antioxidizers, UV stabilizers, lubricants, fillers and similar, in conventional quantities.

The polymerization mixture, coming out of the tubular reactor, can be fed to a conventional devolatizer where it is released from the non reacted monomers and from the solvent. Practically, it is preferred, before devolatization, to increase the conversion in one or more consecutive, tubular reactors. It is preferred to use two tubular reactors, like the first one, in which the solids content, based on the vinylaromatic monomer, can be brought at, at least, the 70% by weight.

Any thin film devolatizer can be employed, such as, the one described in the European patent application Ser. No. 267,025, in the name of the same Applicant, whose content is integral part of the present invention.

The advantage offered by the process of the present invention is that it provides high grafting degrees on the rubber and high grafting yield without any difficulty in removing heat, the formation of incrustations on the walls and the top of the reactor and a premature cross-linking.

In order to better understand the present invention and to put it into practice, some illustrative examples are provided without limiting the scope of the invention.

The examples refer to the figures of the enclosed drawings, in which

Figure 2:
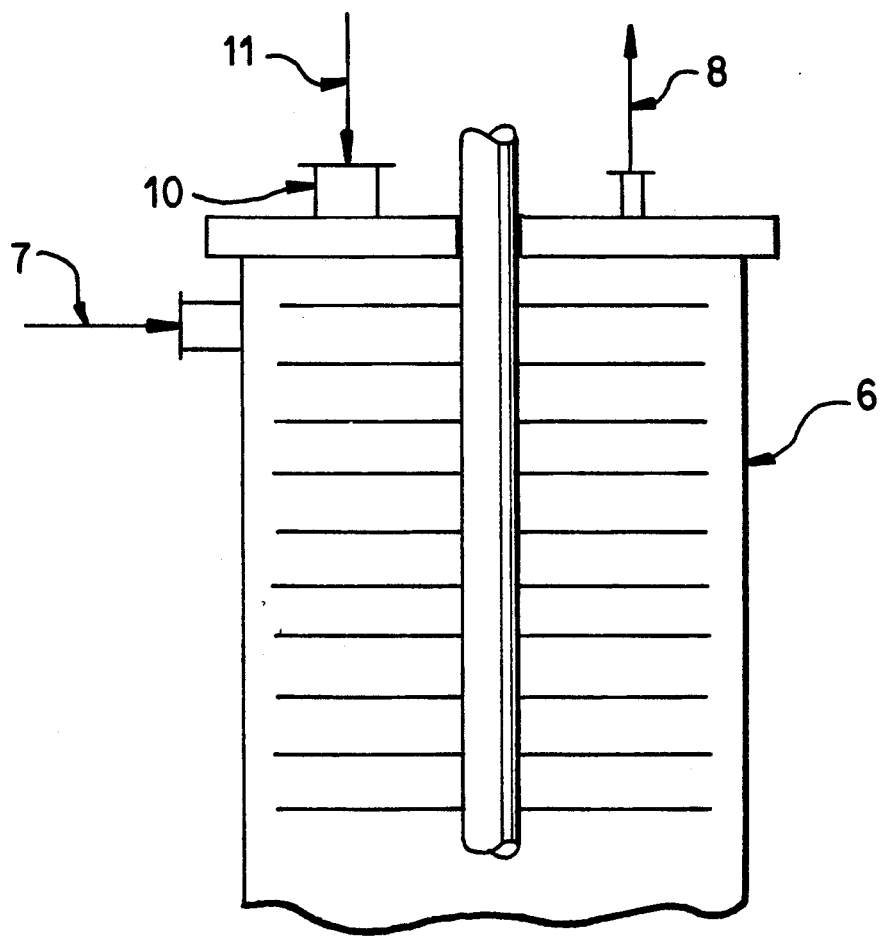

FIG. 1 represents the schematic view of the mixers and of the tubular reactor employed in the process of the present invention, and FIG. 2 represents the enlarged schematic view of the upper part of the tubular reactor considered in FIG. 1.

In the examples all the parts and the percentages are given by weight if it is not otherwise indicated.

EXAMPLE 1

A reaction solution comprising:
5.0 parts, by weight, of polybutadienic rubber of the medium cis type (BUNA HX529);
85.4 parts by weight of styrene
8.1 parts by weight of ethylbenzene
1.5 parts by weight of paraffin oil, and
0.1 parts by weight of a phenolic oxidizer (IRGANOX 1076), was continuously fed, through a preheater (1), at the temperature of about 95° C. and at the flow rate of 1.33 l/h, in to an agitated mixer reactor (2) of the CSTR type having a volume of 1.25 l.

The reaction mixture coming from the head of the reaction tubular reactor (6) through the pipe (8), was added to this solution in the mixer reactor (2) at a flow rate of 0.27 l/h.

The resulting solution was fed through a gear pump (3) at a flow rate of 0.160 l/h into a second agitated mixer reactor (4) of CSTR type having a volume of 0.125 l.

0.02 parts by weight, in comparison with the solution, of a 1,1'-di-tert.butylperoxi-3,3,5-trimethylcyclohexane initiator were injected to the mixer reactor (4) through the pipe (5) at room temperature (about 20° C.). The resulting mixture as was fed, at the flow rate of 1.62 l/h and by a pipe (7), to the head of a vertical tubolar reactor (6) of the plug-flow full type, having a total volume of 2.5 l and a ratio length diameter equal to 5. The reactor was divided into 3 equal reaction zones, thermostated so as to keep the inside reaction mixture according to the following temperature profile:

1st zone: 115° C.
2nd zone: 130° C.
3rd zone: 140° C.

The reactor (6) was equiped with an agitator composed of 48 horizontal arms, turning at 80 rpm.

The residence time of the reaction mixture in the first zone the reactor (6) was of about 35 minutes; while the total reaction residence time was about 2 hours. A continuous nitrogen stream (10), at the flow rate of 2 l/h and at the pressure of $0.2 \times 10^5$ Pascal, and a solution (11) obtained by the condensation of the final polymerization bulk coming out of the reactor (6) and constituted by the 70% by weight of styrene and 30% by weight of ethylbenzene, at the flow rate of 0.05 l/h, were injected on the reactor head (6), near the rupture disk. The reaction mixture was continuously discharged from the tubular reactor (6) at the flow rate of 1.38 l/h; the solids content in the discharged mixture was 40% by weight. Then the reaction mixture was fed through a gear pump (9) to two vertical tubular reactors (not illustrated in figure), equal to the reactor (6), arranged in series, in which the polymerization was completed till a solids content of about 70%, under agitation at increasing temperatures respectively from 130° to 150° C., in the first of the two reactors, and from 150° to 170° C. in the second reactor. The reaction mixture, coming out of the second reactor was heated at 240° C. in a preheater and depurated from the solvent and from the unreacted monomers in an evaporator under vacuum conditions at 10 residual mm Hg.

The polymer discharged from the evaporator had a total volatiles content of 0.08% by weight and its properties are reported in the following table I.

EXAMPLE 2

A reaction solution comprising:
6.25 parts by weight of polybutadienic rubber of the medium cis type (BUNA HX 529);
7.8 parts by weight of styrene;
8.1 parts by weight of ethylbenzene
1.8 parts by weight of paraffin oil, and
0.1 parts by weight of a phenolic antioxidizer (IRGANOX 1076)
was continuously fed, through a preheater (1), at the temperature of about 95° C. and at the flow rate of 1.25 l/h, to an agitated reactor (2) of the type reported in example 1. The reaction mixture, coming from the head of the reaction tubular reactor (6), at the flow rate of 0.27 l/h, was added to the solution.

The resulting solution was fed, at the flow rate of 1.52 l/h and through a gear pump (3) to a second agitated mixer reactor (4).

In the same mixer reactor (4) a mixture was added composed of 5.85 parts by weight of acrylonitrile and 0.02 parts by weight of initiator of example 1, at the flow rate of 0.08 l/h.

The resulting mixture was fed to the head of the tubular reactor (6) the same as the one described in example 1 at the flow rate of 1.6 l/h.

The employed temperature profile was:
1st zone: 110° C.
2nd zone: 124° C.
3rd zone: 136° C.

The residence time of the reaction mixture in the first zone and the total residence time in the reactor (6) were the same as in example 1.

The adopted operative conditions were the same as in in example 1 and the content of solids coming out of the reactor (6) was of 40% and that outcoming from the last vertical reactor of 70%.

The characteristics of the high impact copolymer are reported in Table I.

TABLE 1

| CHARACTERISTICS | Standard ASTM | Unit | EXAMPLE N. 1 | EXAMPLE N. 2 |
|---|---|---|---|---|
| Total rubber | (1) | % | 7 | 8,5 |
| Bound Acrylonitrile | (2) | % | — | 8,0 |
| Melt Index (200° C./5 kg) | D 1238 | g/10' | 4,3 | 3,2 |
| VICAT B (1 kg/50° C./h) | D 1525 | °C. | 96 | 100 |
| IZOD notched impact resistance 23° C.-$\frac{1}{2}$" × $\frac{1}{2}$" | D 256 | J/m | 80 | 70 |
| Dart drop resistance | (3) | J | 10 | 17 |
| Tensile modulus | D 638 | N/mm² | 1700 | 1400 |
| Gel | (4) | % | 24.0 | 29 |
| Swelling index | (5) | | 14 | 13,5 |
| Particles mean cord | (6) | micrometers | 1,5 | 2,7 |

(1) The total rubber was determined by iodometric titration.
(2) The bound acrylonitrile was determined by the nitrogen content measured by elemental analysis or via Kjedahl.
(3) The dart drop resistance test lies in letting a 4560 g body fall from variable heights on round injection molded (co)polymer specimens having a 100 mm diameter and 3,2 mm thickness.
(4) As gel content, the elastomeric phase insoluble in toluene was considered. The test carried out is the following one:
A 2 g sample is dispersed in 100 cc of a mixuture constituted by 57% by weight of toluene and 43% by weight of methyl-ethylketone. After centrifugation at 10,400 × G, the insoluble part is separated by decantation in swelling gel form. The gel is repeatedly washed with the above mentioned toluene-methyl-ethylketone mixture and it is centrifuged till the washing solvent gets turbid because of the ethanol addition. The swelled and washed gel is coagulated, separated by filtration and dried at 45° C. under vacuum conditions at 200 mm Hg for 12 hours. The content of elastomeric phase insoluble in toluene is calculated by the equation:

$$\text{content by \%} = \frac{\text{weight of the dried gel}}{2} \cdot 100$$

(5) The swelling index of the elastomeric phase was determined as follows:
3 g of polymer are dispersed in 100 cc of toluene. After centrifugation at 10.400 × G the insoluble part is separated by decantation in gel form. The gel is repeatedly washed with toluene and centrifuged till the washing solvent gets turbid because of ethanol addition.
Two portions of the so obtained gel were put on a glass filter equipped with porous diaphragm GA type. Each filter is put into a beaker, at room temperature, and into an empty and closed drier, in such a way that it laps the toluene. Under these conditions the gel absorbs the solvent and swells up. Once the equilibrium was reached, the swelled gel is weighed. The swelled gel is then flocculated in ethanol, dried at 45° C. at 200 mm Hg for 12 hours and weighed. The swelling index is calculated by the ratio:

$$\frac{\text{Weight of the wet swelled gel}}{\text{weight of the dried gel}}$$

TABLE 1-continued (6) The mean cord of the rubbery particles was determined by a linear calculation method effected on microphotographs in phase contrast with 1000 enlargements.

EXAMPLE 3

A reaction solution comprising:
7.0 parts by weight of EPDM rubber of the terpolymer ethylene/propylene/5 ethylidene-2-norbornene type, containing: 50% of propylene and 3,5%, of ethylidene-2-norbornene and having a viscosity Mooney ML 4 at 100° C. equal to 50;
81.25 parts by weight of styrene;
10.0 parts by weight of ethylbenzene;
1.75 parts by weight of paraffin oil;
0.022 parts by weight of tertiarydodecilmercaptane (TDM);
0.1 parts by weight of a phenolic antioxidizer (Irganox 1076)

was continuously fed through a preheater (1) at the temperature of about 95° C. and at the flow rate of 1,33 l/h, to an agitated mixer reactor (2) of the type reported in example 1.

The reaction mixture, coming from the head of the tubular reaction reactor (6), at the flow rate of 0.27 l/h, was added to the solution.

The solution was fed, at the flow rate of 1.6 l/h and through a gear pump (3), to a second agitated mixer reactor (4).

In the same mixer reactor (4) respectively 0.04 and 0.05 parts by weight, in comparison with the solution, of the following initiators have been fed: 1,1' ditertbutyl-peroxi-3,3,5-trimethyl-cyclohexane and ditertiary-butylperoxide, through the pipe (5) at room temperature (about 20° C.). The resulting mixture was fed to the head of the tubular ractor (6) equal to the one described in example 1, at the flow rate of 1,60 l/h.

The employed temperature profile was:
1st zone: 105°
2nd zone: 115°
3rd zone: 125°

The residence time of the reaction mixture in the first zone of the reactor (6) was about 1 hour; while the total reaction residence time was about 3 hours.

The adopted operative conditions were the same as in example 1, with the only variant of the temperatures that were respectively from 130° to 140° in the first of the two reactors and from 140° to 150° in the second reactor, and the solids content coming out of the reactor (6) was about 40% and that coming out of the last vertical reactor of about 70%.

The characteristics of the high impact polymer are reported in table II.

TABLE II

| CHARACTERISTICS | Standard | Unit | |
|---|---|---|---|
| Total rubber | (7) | % | 10 |
| Melt Index (200° C./5 kg) | D 1238 | g/10' | 3 |
| VICAT B | D 1525 | °C. | 93 |
| IZOD notched impact resistance 23° C.-⅛" × ½" | D 256 | J/m | 100 |
| Dart drop resistance | (3) | J | 6 |
| Tensile modulus | D 638 | N/mm² | 1600 |
| Particles mean cord | (6) | micrometers | 2.9 |

(7) The total rubber has been determined by infra-red spectrophotometry.

What is claimed is:

1. Process for the continuous bulk production of vinylaromatic copolymers consisting of a vinylaromatic monomer, rubber and if present, a comonomer selected from the group consisting of acrylonitrile, methacrylonitrile, acrylic acid, methacrylic acid and alkyl- or cyclo-alkyl-esters of acrylic acid and methacrylic acid containing from 1 to 8 carbon atoms in the alkyl group, consisting of:
   a) mixing, at a temperature under 100° C., in at least one heated mixer, the vinylaromatic monomer, the rubber, the catalyst, the comonomer, if present, and an inert solvent to form an initial mixture to be polymerized, and in addition the copolymer formed from these monomers to form a total mixture, said catalyst being present in a quantity not exceeding 0.1% by weight with respect to the vinylaromatic monomer and the comonomer, if present, and the copolymer being present in a quantity not exceeding 10% by weight with respect to the initial mixture to be polymerized;
   b) feeding the total mixture of step a) into at least one plug-flow agitated tubular vertical reactor, wherein the total mixture of step (a) is fed into the head of the at least one plug-flow agitated tubular vertical reactor, said at least one plug-flow agitated tubular vertical reactor being divided into three successive zones heated at different temperatures between 100° and 150° C., at a flow rate higher than the flow rate of the polymerized mixture being discharged from said plug-flow agitated tubular vertical reactor to form an excess mixture;
   c) recycling the excess mixture from the at least one plug-flow agitated tubular vertical reactor of step b) back to the mixer of step a);
   d) injecting solvent into the top of the at least one plug-flow agitated tubular vertical reactor in a quantity effective to prevent polymerization at the top of the at least one plug-flow agitated tubular vertical reactor and not exceeding 5% by weight, with respect to the initial mixture to be polymerized;
   e) keeping the reaction mixture of step b) in a first zone of the at least one plug-flow agitated tubular vertical reactor for a time and temperature sufficient to halve the catalyst life; and
   f) carrying on the polymerization in the remaining zones of the at least one plug-flow agitated tubular vertical reactor until a solids content yield of at least 40% by weight coming out of the third zone is obtained.

2. Process according to claim 1, in which the mixing of step a) is carried out in two separate mixers, the first of which is kept at a temperature not exceeding 100° C., wherein the vinylaromatic monomer, the rubber and inert solvent are mixed; and the second, not heated, the catalyst and the comonomer, if present, are added.

3. Process according to claim 1, in which the rubber is a homopolymer or copolymer of conjugated dienes having from 4 to 6 carbon atoms and having a transition temperature of the second order (Tg) lower than −20° C.

4. Process according to claim 3, in which the rubber is polybutadiene having a fraction of cis configuration above 25%.

5. Process according to claim 1, in which the rubber is a rubbery ethylene-propylene copolymer or an ethylene-propylene-diene terpolymer.

6. Process according to claim 1, in which the rubber is employed in quantities between 1 and 20% by weight based on the initial mixture to be polymerized.

7. Process according to claim 1, in which the inert solvent is added in quantities between 5 and 10% by weight, with respect to the initial mixture to be polymerized.

8. Process according to claim 1, in which the catalyst is added in quantities between 0.005 and 0.05% by weight with respect to the vinylaromatic monomer and the comonomer, if present.

9. Process according to claim 8, in which the catalyst is a radical initiator.

10. Process according to claim 1, in which a chain transfer agent is added to the initial mixture in a quantity between 0.01 and 0.3% by weight with respect to the vinylaromatic monomer.

11. Process according to claim 1, in which the vinyl aromatic monomer is styrene or styrene having one or more hydrogen atoms replaced by alkyl-, aryl-radicals, an halogen or a nitro radical.

12. Process according to claim 1, in which the quantity of comonomer is between 0 and 50% by weight with respect to the monomeric mixture.

13. Process according to claim 1, in which the at least one plug-flow agitated tubular vertical reactor has a length/diameter ratio above 2.

14. Process according to claim 1, in which the solvent injected into the top of the at least one plug-flow agitated tubular vertical reactor is recovered by distillation from the polymerization bulk at the end of the process.

15. Process according to claim 1, in which, the at least one plug-flow agitated tubular vertical reactor of step b) includes a rupture disk and nitrogen or an other inert gas is blown at a pressure above $0.1 \times 10^5$ Pascal into the zone under the rupture disk.

16. Process according to claim 1, in which step b) utilizes a plurality of serially disposed plugflow agitated tubular, vertical, reactors and the polymerization mixture coming out of the third zone of the first plugflow tubular vertical reactor is further polymerized in the additional reactors until a solids content yield of at least 70% by weight, with respect to the the vinyl aromatic monomer is obtained, and then the mixture is devolatized.

17. Process according to claim 16, in which the further polymerization is performed in two plug-flow agitated tubular vertical reactors.

18. Process according to claim 6 in which the rubber is employed in quantities between 2 and 15% by weight based upon the initial mixture to be polymerized.

19. Process according to claim 9, in which the radical initiator is an organic peroxide.

20. Process according to claim 10, in which the chain transfer agent is a mercaptan containing from 4–18 carbon atoms.

21. Process according to claim 12 in which the quantity of comonomer is between 5 and 30% by weight with respect to the monomeric mixture.

22. Process according to claim 13, in which the at least one plug-flow agitated tubular vertical reactor has a ratio of length to diameter between 3 and 10.

23. Process according to claim 15 in which the innert gas is blown in at a pressure between $0.2 \times 10^5$ and $1 \times 10^5$ Pascals.

* * * * *